United States Patent
Weed

(10) Patent No.: US 7,842,288 B2
(45) Date of Patent: Nov. 30, 2010

(54) MARINE ANTI-BIO-FOULING COATING AND A METHOD OF APPLYING THE COATING

(76) Inventor: Gareth Weed, c/o Ecosea Limited, Ocean Quay, Belvidere Road, Southampton (GB) SO145QY (*) Notice: Subject to any disclaimer, the term of this patent is extended or adjusted under 35 U.S.C. 154(b) by 1231 days.

(21) Appl. No.: 11/009,174

(22) Filed: Dec. 10, 2004

(65) Prior Publication Data

US 2005/0152869 A1 Jul. 14, 2005

(30) Foreign Application Priority Data

Dec. 12, 2003 (GB) ............................ 0328812.3
Jun. 24, 2004 (GB) ............................ 0414109.9

(51) Int. Cl.
*A01N 25/12* (2006.01)

(52) U.S. Cl. ............... 424/78.09; 106/1.23; 106/15.05; 420/485; 420/493; 420/496; 427/205; 427/419.1; 424/405; 424/407; 424/409; 424/411; 424/417; 424/421; 424/630; 424/635; 424/639; 424/646; 523/122

(58) Field of Classification Search ............... 424/78.09
See application file for complete search history.

(56) References Cited

U.S. PATENT DOCUMENTS

| | | | |
|---|---|---|---|
| 4,814,227 A * | 3/1989 | Maeda et al. | 428/353 |
| 5,266,105 A * | 11/1993 | Tsuneta et al. | 106/16 |
| 5,374,665 A * | 12/1994 | Isaka et al. | 523/122 |
| 5,492,696 A * | 2/1996 | Price et al. | 424/417 |
| 2002/0119255 A1 | 8/2002 | Divigalpitiya et al. | |
| 2003/0155688 A1 | 8/2003 | Oram et al. | |

FOREIGN PATENT DOCUMENTS

| | | |
|---|---|---|
| EP | 0 562 441 A2 | 9/1993 |
| EP | 1 484 175 A1 | 12/2004 |
| JP | 63 110269 A | 5/1988 |
| WO | WO 83/03804 A1 | 11/1983 |

OTHER PUBLICATIONS

PCT International Search Authority, "International Search Report" dated May 3, 2005 for PCT/GB2004/005162, 7pgs.

* cited by examiner

*Primary Examiner*—Neil Levy
(74) *Attorney, Agent, or Firm*—Buckley, Maschoff & Talwalkar LLC

(57) ABSTRACT

A marine anti-bio-fouling coating 10, for application onto the surface of a marine article 12. The coating 10 comprises a self-levelling, self-curing epoxy resin primer adhesive 14, an adhesive modified epoxy resin binder adhesive 16 and granulated Copper Nickel alloy 18. When a coated marine article 12 is immersed in water a chemical reaction occurs between the water and the Copper Nickel alloy 18 which causes a film of a complex metal oxide 20 to form on the exterior surface of the layer of Copper Nickel alloy granules 18. The oxide film 20 forms an inhospitable environment to aquatic organisms and aquatic borers, thereby preventing bio-fouling occurring on the coated marine article. A method of applying the coating 10 to a marine article 12 is also provided.

3 Claims, 4 Drawing Sheets

MARINE ANTI-BIO-FOULING COATING AND A METHOD OF APPLYING THE COATING

This application is a U.S. National filing under 35 U.S.C §119 hereby claiming priority to GB Application No. 0328812.3, filed Dec. 12, 2003 and GB Application No. 0414109.9, filed Jun 24, 2004, the contents which are incorporated herein by reference for all purposes.

The invention relates to a marine anti-bio-fouling coating and a method of applying the coating.

Articles which spend considerable periods of time underwater, i.e. marine articles, for example the hulls of ships, need to be protected to prevent the growth of aquatic organisms on them, and, in the case of wooden hulls, to prevent aquatic borers, such as Toredo worm and Gribble, boring into them. This is currently achieved by coating marine articles with anti-fouling paints.

Early anti-fouling paints contained Cuprous-Oxide as the effective ingredient, but their performance was poor. More recent anti-fouling paints contained both Cuprous-Oxide, Tin and Tri-Butyl-Tin compounds (TBTs) as the effective ingredients. These paints provided an improved performance but are toxic both to humans and the general marine environment, and their use lead to damage of aquatic life, including shellfish stocks. The use of TBTs has now been banned on all craft under 25 metres in length.

In order to treat a marine article, for example a ship hull, with anti-fouling paint the article must be removed from the water, any existing aquatic growth must be removed and the area to be painted must be scrubbed clean before the anti-fouling paint can be applied. This treatment should ideally be carried out every year and is time consuming, unpleasant and expensive. In addition, the whole procedure can cause mechanical stress within the marine article being treated.

According to a first aspect of the invention there is provided a marine anti-bio-fouling coating comprising:
  primer adhesive to be applied onto a surface to be coated;
  binder adhesive to be applied over the primer adhesive; and
  metallic material to be applied over the binder adhesive, the binder adhesive and the primer adhesive thereby fixing the metallic material to the surface to be coated,
  the metallic material comprising one or more metals which oxidise when In contact with water,
  such that, when the coated surface is immersed in water, a layer of metal oxide is formed on the exterior surface of the metallic material.

The metallic material may comprise copper or may comprise a copper alloy. The metallic material preferably comprises a copper nickel alloy. The copper nickel alloy preferably comprises eighty-eight percent copper and ten percent nickel, the remaining two percent comprising Iron and Manganese.

The metallic material is preferably granulated. The granules preferably have a diameter of up to 250 microns, and most preferably have a diameter of between 10 microns and 250 microns. The granules are preferably substantially spherical, and are most preferably of a type produced by gas atomisation.

The primer adhesive is preferably a self-curing adhesive. The primer adhesive is preferably a self-levelling adhesive. The primer adhesive is preferably an epoxy resin adhesive, and most preferably comprises a 2 component, solvent free cyclo aliphatic/aliphatic amine cured bisphenol A type epoxy resin system.

The binder adhesive is preferably a self-curing adhesive. The binder adhesive preferably has a long curing time. The binder adhesive is preferably an adhesive modified epoxy resin, and most preferably comprises epoxy resin plus one or more thixotropic agents. The epoxy resin preferably comprises a solvent free cyclo aliphatic/aliphatic amine cured bisphenol A type epoxy resin system. The thixotropic agents preferably comprise free flowing dry amorphous materials. The binder adhesive is preferably provided as a layer having a thickness of not more than two-thirds of the diameter of the granules of metallic material.

According to a further aspect of the invention there is provided a method of applying a marine anti-bio-fouling coating according to the first aspect of the invention to a surface to be coated, the method comprising:
  applying a layer of primer adhesive onto the surface;
  curing the primer adhesive;
  applying a layer of binder adhesive over the layer of primer adhesive; and
  applying a layer of metallic material over the layer of binder adhesive.

Where the metallic material is granulated metallic material, the granules are preferably sprayed onto the layer of binder adhesive, most preferably using pressurised spraying apparatus. The granules are preferably sprayed onto the layer of binder adhesive in a spray having a fan or cone shaped granule distribution. The granules are preferably distributed substantially evenly across the binder adhesive.

The primer adhesive is preferably sprayed onto the surface. The primer adhesive may alternatively be applied onto the surface using roller means.

The layer of binder adhesive preferably comprises a thin film of binder adhesive, which most preferably has a thickness of not more than two-thirds of the diameter of the granules of metallic material.

The method may additionally comprise a cleaning stage, prior to the application of the primer adhesive, during which the surface to be coated is cleaned of any previously existing coating materials and/or contaminants, such as grease and oil.

According to a first aspect of the invention there is provided a marine anti-bio-fouling coating comprising:
  a carrier membrane;
  a first adhesive layer provided across one surface of the carrier membrane; and
  a layer of metallic material provided on top of the first adhesive layer, the adhesive thereby fixing the metallic material to the carrier membrane,
  the metallic material comprising one or more metals which oxidise when in contact with water,
  such that, when the coating is immersed in water, a layer of metal oxide is formed on the exterior surface of the layer of metallic material.

The metallic material preferably comprises a copper nickel alloy. The copper nickel alloy preferably comprises eighty-eight percent copper and ten percent nickel, the remaining two percent comprising Iron and Manganese.

The metallic material is preferably granulated, the granules most preferably having a size of between 10 microns and 200 microns.

The carrier membrane preferably comprises a water impermeable material, and is most preferably an inert, water impermeable material. The carrier membrane is preferably a non-stretch material. The carrier membrane may comprise a synthetic material, such as polyester. The carrier membrane may be in the form of a sheet or an elongate strip.

The first adhesive layer preferably comprises a layer of thermally curable adhesive, an optically curable adhesive, or a chemically curable adhesive.

The coating may further comprise a second adhesive layer provided across the other side of the carrier membrane, for fixing the coating to a surface to be coated. The second adhesive layer may comprise a layer of epoxy resin or acrylic adhesive. A removable backing layer may be provided across the second adhesive layer, the backing layer being removed to expose the second adhesive layer prior to the coating being applied to the surface to be coated.

The first and second adhesive layers preferably comprise adhesives which are resistant to long term submersion in water.

According to a further aspect of the invention there is provided a method of manufacturing a marine anti-bio-fouling coating, the method comprising:

applying a first layer of adhesive to one side of a carrier membrane;

applying a layer of metallic material on top of the first adhesive layer; and applying pressure onto the layer of metallic material to bond the metallic material to the first layer of adhesive and thus to the carrier membrane.

The metallic material is preferably granulated and the granules are distributed across the first layer of adhesive. The granules of metallic material are preferably sprinkled onto the first layer of adhesive through a sieve.

Pressure is preferably applied to the layer of granulated metallic material by passing the coating between a pair of rollers, the rollers applying pressure to the granules of metallic material and bonding them to the first layer of adhesive.

The method may comprise the further step of curing the first layer of adhesive, to further bond the layer of granulated metallic material to the adhesive. The adhesive may be thermally cured, optically cured or chemically cured.

The method may additionally comprise the step of applying a second layer of adhesive to the other side of the carrier membrane, for fixing the coating to a surface to be coated. The method may further comprise the step of applying a removable backing layer on top of the second adhesive layer, the backing layer to be removed to expose the second adhesive layer prior to the coating being applied to the surface to be coated. According to a further aspect of the invention there is provided apparatus for manufacturing a marine anti-bio-fouling coating, the apparatus comprising:

adhesive application means operable to apply a first layer of adhesive to one side of a carrier membrane;

metallic material application means operable to distribute granulated metallic material across the first layer of adhesive; and pressure application means operable to apply pressure onto the layer of granulated metallic material, to thereby press the granules into the first layer of adhesive.

The metallic material application means preferably comprises a storage hopper for storing granulated metallic material and a distribution head for distributing granulated material onto the first layer of adhesive. The distribution head preferably comprises a sieve through which the granulated metallic material is sprinkled onto the first layer of adhesive.

The pressure application means preferably comprises a pair of rollers, which are most preferably a pair of hard surfaced pinch rollers. The pressure application means preferably further comprises pressure adjustment means operable to adjust the amount of pressure applied by the rollers. The surface of each roller is preferably coated with a non-stick material, such as polytetrafluoroethylene (PTFE).

The apparatus preferably further comprises adhesive curing means operable to cure the first layer of adhesive. The adhesive curing means is preferably provided after the pressure application means. The adhesive curing means may comprise an oven operable to heat the adhesive, to thereby thermally cure the adhesive.

The adhesive curing means may alternatively comprise an optical source operable to generate an optical signal exposure of the adhesive to the optical signal causing polymerisation of the adhesive. The optical source is preferably operable to generate an optical signal having a narrow spectral bandwidth, the spectral bandwidth preferably lying within the ultra violet region of the optical spectrum or within the infra red region of the optical spectrum.

The adhesive curing means may further alternatively comprise a curing chamber in which the coating is exposed to one or more catalytic chemicals. The chemicals may be provided within a liquid or a gas, in which the coating is immersed within the curing chamber.

The adhesive application means may be further operable to apply a second layer of adhesive to the other side of the carrier membrane.

The apparatus may further comprise means for applying a removable backing layer on top of the second adhesive layer, the backing layer to be removed to expose the second adhesive layer prior to the coating being applied to the surface to be coated.

Embodiments of the invention will now be described in detail, by way of example only, with reference to the accompanying drawings, in which.

Figure 1:
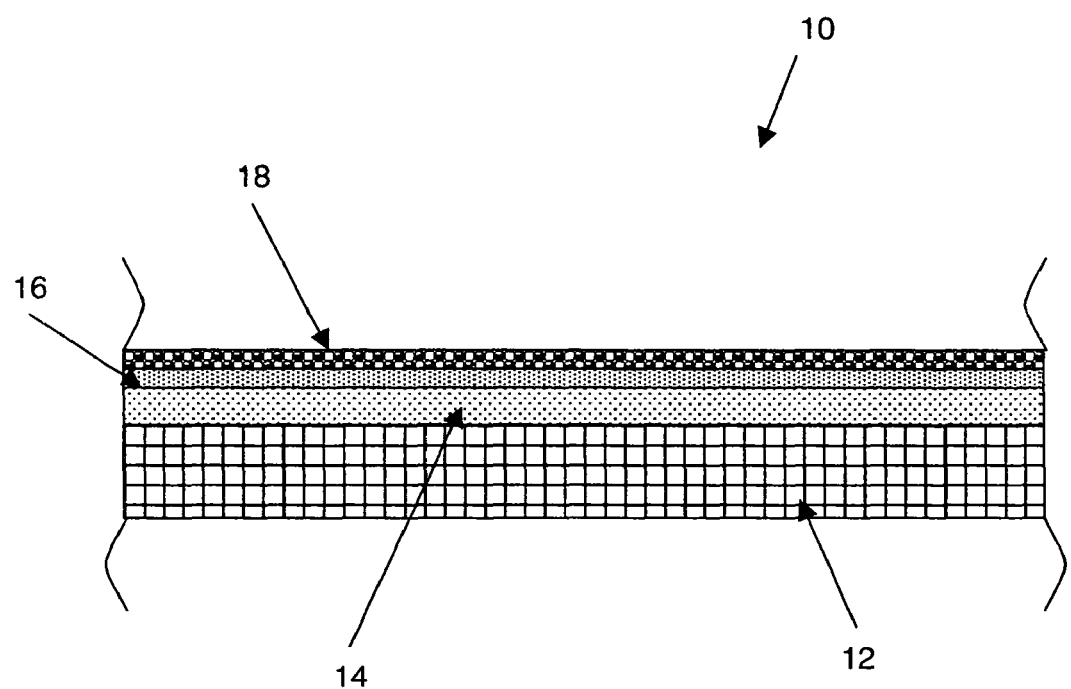
FIG. 1 is a diagrammatic cross-sectional view of a section of marine anti-bio-fouling coating according to an embodiment of the invention, the coating shown applied to the surface of a marine article.

Referring to FIG. 1, a first embodiment of the invention provides a marine anti-bio-fouling coating 10. The coating 10 is for application onto the surface of a marine article 12, such as the hull of a ship.

The coating 10 comprises primer adhesive 14, binder adhesive 16 and metallic material 18.

In this example the primer adhesive 14 takes the form of a self-levelling, 2 component, cold cure (i.e. self-curing), solvent free cyclo aliphatic/aliphatic amine cured bisphenol A type epoxy resin system to be applied as a layer over the surface 12 to be coated. The binder adhesive 16 comprises an adhesive modified epoxy resin which in this example takes the form of a solvent free cyclo aliphatic/aliphatic amine cured bisphenol A type epoxy resin system containing free flowing dry amorphous materials to add thixotropy to the resin system. In this example, the primer adhesive 14 has a thickness of ~250 μm.

The binder adhesive 16 is to be applied as a thin film over the primer adhesive 14.

The metallic material 18 comprises granulated Copper Nickel alloy, which is to be applied over the binder adhesive 16. The Copper Nickel alloy 18 used here comprises 88% (by weight) Copper, and 10% Nickel, with the remaining 2% comprising Iron and Manganese. The granules of the Copper Nickel alloy 18 are produced by a known gas atomisation process which will be well known to persons skilled In the art and so will not be described in detail here. The granules are of a regular spherical shape and have a diameter of up to 250 μm. In this example, the granules have a diameter of not less than 150 μm.

The film of binder adhesive 16 is to have a thickness of not more than two-thirds the diameter of the Copper Nickel alloy granules 18. In this example the binder adhesive has a thickness of ~60 μm.

A second embodiment of the invention provides a method of applying the coating 10 of the first embodiment, as follows.

The method is carried out with the marine article out of water, for example in a dry-dock. The surface to be coated, in this example the exterior surface of the ship hull 12, Is first thoroughly cleaned to remove any previously existing coatings or painted materials, grease, oil and any other contaminants.

Once the surface 12 is clean, a layer of primer adhesive 14 is applied over the surface 12 using a conventional roller. The primer adhesive 14 may alternatively be sprayed over the surface 12. The primer adhesive 14 is then left to self-level and self-cure. The primer adhesive acts to seal the surface 12 and covers any imperfections on the surface 12. The layer of primer adhesive 14 also provides an excellent bonding site for the binder adhesive 16.

Following curing of the primer adhesive 14, a layer of binder adhesive 16 is applied over the layer of primer adhesive 14. The chemical nature of the interaction between the primer adhesive 14 and the binder adhesive 16 forms powerful bond between these two layers.

The binder adhesive 16 is applied as a thin film using a conventional roller. The film of binder adhesive 16 is applied so as to have a thickness of not more than two-thirds the diameter of the Copper Nickel alloy granules 18. This is achieved by careful measurement of the area of the surface 12 to be coated, together with careful measurement of the volume of binder adhesive 16 to be applied over the area.

The binder adhesive 16 provides an adhesive layer which can support the weight of a denser material, in this case the Copper Nickel alloy granules 18, whilst in it's 'un-cured' state. The binder adhesive 16 has a long curing time, to provide a sufficiently long time period for applying the Copper Nickel alloy granules 18 onto it.

Following application of the binder adhesive 16, the granulated Copper Nickel alloy 18 is applied over the binder adhesive 16. In this example, the Copper Nickel alloy granules 18 are sprayed onto the binder adhesive 16 using a pressurised spray system which delivers a fine spray of granules 18, the spray having either a fan or cone configuration. The spray tool uses a low pressure system to 'broadcast' the granules 18 onto the tacky binder adhesive 16. The granules 18 are substantially evenly distributed across the binder adhesive 16 coated surface 12.

The binder adhesive 16 is left to continue to cure following the application of the Copper Nickel alloy granules 18. After several hours the binder adhesive 16 begins to polymerise and cures to a tough, durable and consistent surface which encapsulates the layer Copper Nickel alloy granules 18 at it's surface.

The metallic material, in this case the Copper Nickel alloy granules 18, comprises the outermost layer of the coating 10, so that when the coated marine article 12 is submersed in water, the metallic material 18 is exposed to the water.

Figure 2:
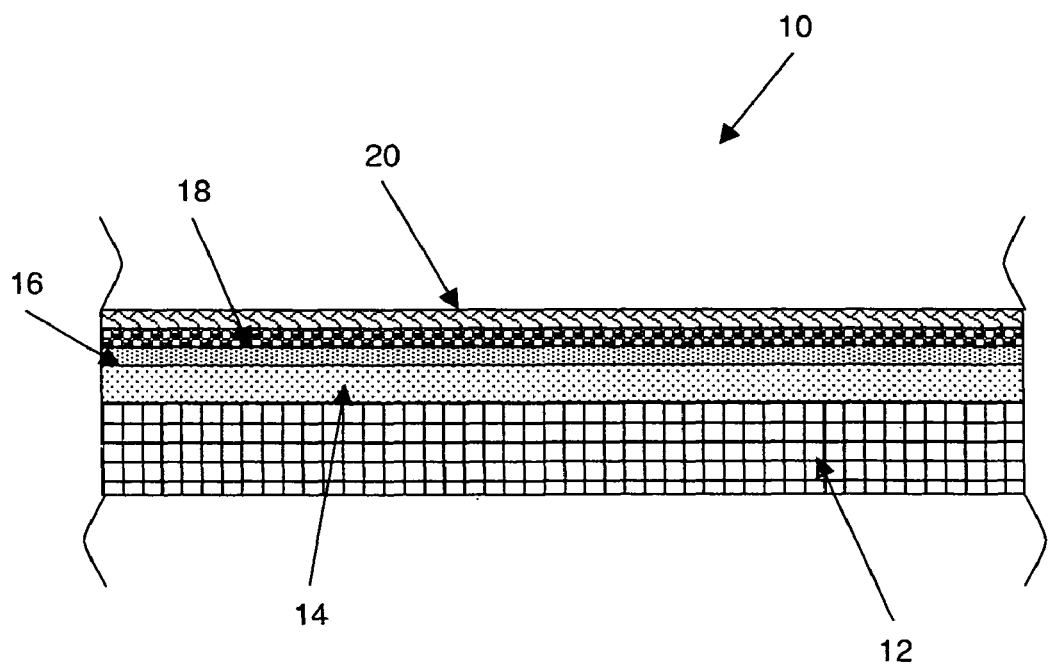
FIG. 2 is a diagrammatic cross-sectional view of the section of marine anti-bio-fouling coating of FIG. 1 following submersion of the marine article in water.

As illustrated in FIG. 2, when the coating 10 is submersed in water, a chemical reaction occurs between the water and the Copper Nickel alloy 18 which causes a film of a complex metal oxide 20 to form on the exterior surface of the layer of Copper Nickel alloy granules 18. The oxide film 20 forms an inhospitable environment to aquatic organisms and aquatic borers, thereby preventing bio-fouling occurring on the coated marine article.

Due to the spherical nature of the Copper Nickel alloy granules 18 the effective exposed surface area of the coating 10 is at least 30% greater than the actual area of the surface 12 being coated.

Various modifications may be made without departing from the scope of the invention. For example, the Copper Nickel alloy may be of a different composition to that described. The metallic material may alternatively comprise granules of Copper or of a different alloy of Copper. The granules may be of a different shape to that described. The granules may be of a different diameter to that described, and may have a diameter of up to 250 μm.

The marine anti-bio fouling coating may be applied to a different marine article to that described. The primer adhesive may comprise a different type of adhesive to that described. The binder adhesive may comprise a different type of adhesive to that described.

The described embodiments provide various advantages, as follows. The marine anti-bio fouling coating is suitable for use on a wide range of materials including glass reinforced plastics, concrete, steels, aluminium, wood, thermoplastic materials and ceramics. The coating is applied directly on the surface of the marine article to be protected, enabling surfaces of non-uniform or irregular shapes, such as boat hulls, to be coated.

The layer of metallic material is robust and the oxide layer which forms an the exterior surface of the metallic material protects the coating against corrosion. The marine anti-bio fouling coating according to the invention is long lasting by comparison to currently available anti-fouling paints, having a lifetime many times longer than that of conventional anti-fouling paints. Minimum or no maintenance of the coating is required during its lifetime. The coating provides a marine article with a tough and durable exterior surface, which is resistant to mild abrasion and direct contact when lifted with, for example, strops.

The coating provides the coated marine article with effective protection against fouling which lasts for more than one year and is generally environmentally friendly. The coating is inert and fabricated from non hazardous materials, and contains no synthetic biocides.

The provision of the metallic material in the form of granulated particles allows the coated marine article to flex.

The coating has an active anti-bio-fouling surface that has an area equal to approximately 130% of the area of the coated surface.

Figure 3:
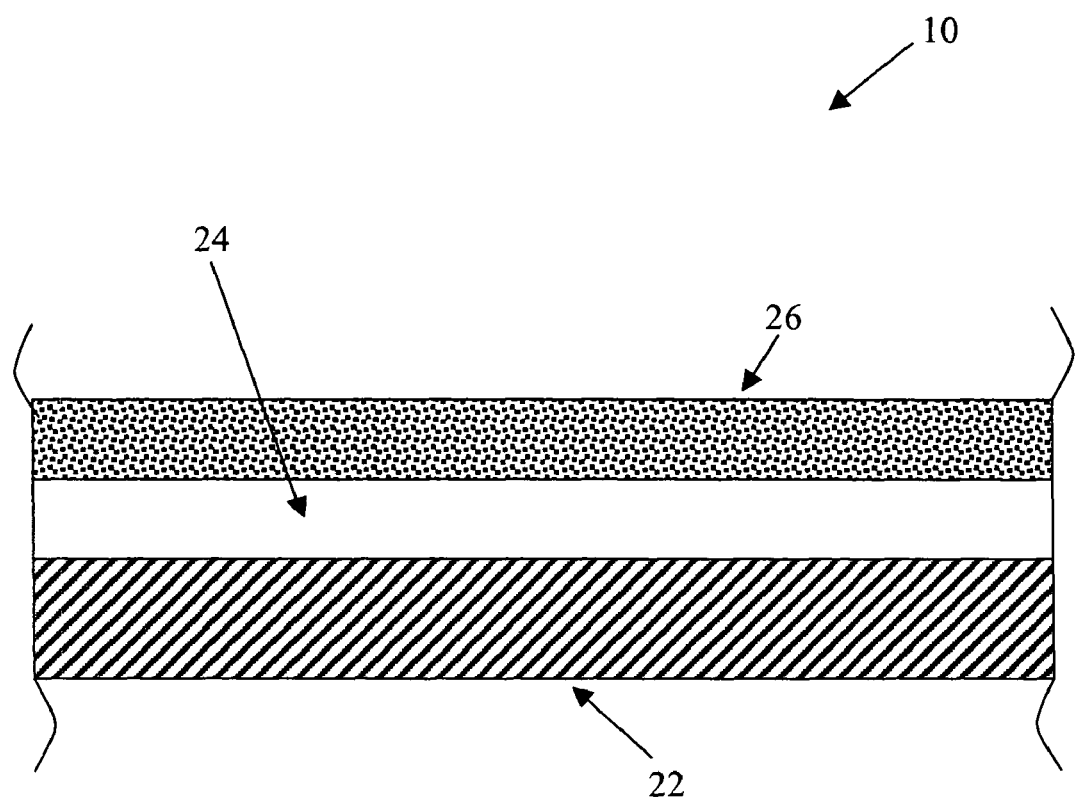
FIG. 3 is a diagrammatic cross-sectional view of a section of a marine anti-bio-fouling coating according to a first embodiment of the invention.
Figure 4:
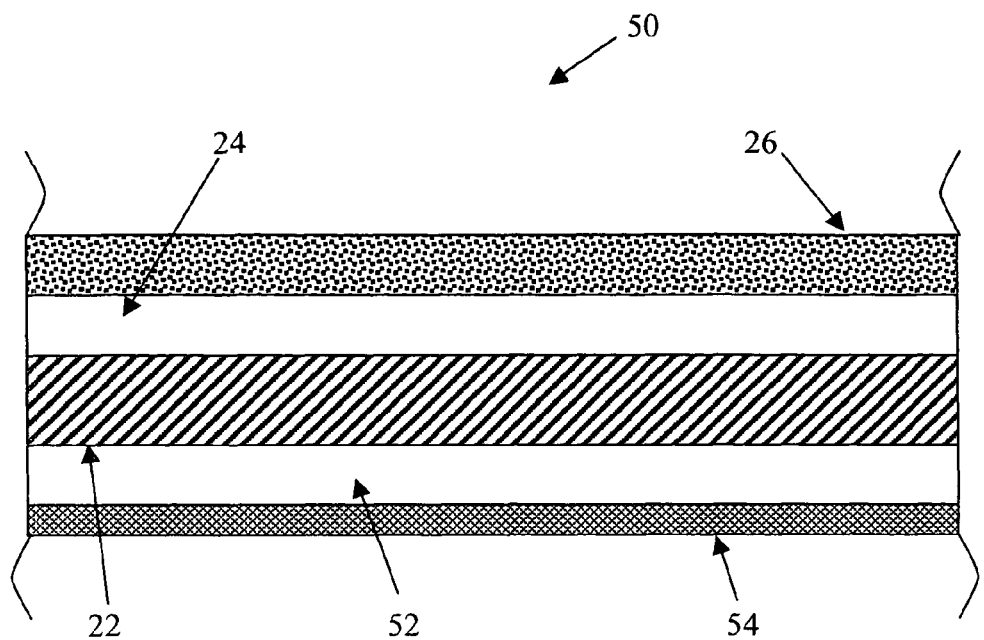
FIG. 4 is a schematic representation of apparatus for manufacturing the marine anti-bio-fouling coating of FIG. 3.

Referring to FIG. 3, a first embodiment of the invention provides a marine anti-bio-fouling coating 10 comprising a carrier membrane 22, an adhesive layer 24 and a layer of metallic material 26.

In this example the carrier membrane 22 comprises a sheet, or a length of broad tape, of a non-stretch, impermeable polyester membrane. The carrier membrane 22 forms the core of the coating 10 and supports the adhesive layer 24. The adhesive layer 24 comprises a layer of an adhesive which is resistant to long term submersion in water i.e. its properties are unaffected by long term immersion in water. In this example, the adhesive is a thermally curable epoxy.

The layer of metallic material 26 comprises layer of a granulated Copper Nickel alloy. The ratio of Copper to Nickel within the alloy is controlled within a tight tolerance of 9 parts Copper to 1 part Nickel with a small percentage of the total alloy (2%) being allocated to Iron and Manganese. The granules have a size of between 10 µm and 200 µm. The Copper Nickel alloy granules are substantially evenly distributed across the adhesive layer 24, to form the layer of metallic material 26. Forming the layer of metallic material 26 from granulated metal allows the coating 10 to flex, during both application and use, and to thereby closely conform to the shape of a surface to which the coating 10 is applied, including any irregular shapes within the surface.

The coating 10 is manufactured, using the apparatus 30 of a second embodiment of the invention shown in FIG. 6, using the method of a third embodiment of the invention, as follows. An adhesive applicator 22 applies a layer of adhesive 24 to one side of the carrier membrane 22. The carrier membrane 22 plus adhesive layer 24 is then passed to metallic material application means 24, where a layer of granulated Copper Nickel alloy 26 Is applied on top of the adhesive layer 24.

In this example, the metallic material application means 34 comprises a storage hopper 36, in which the granulated Copper Nickel alloy 36 is stored, and a distribution head, in the form of a sieve 38, through which the granulated Copper Nickel alloy is sprinkled onto the adhesive layer 34.

Once applied onto the adhesive layer 34, the granulated Copper Nickel alloy 36 is fused into the adhesive layer 34, as follows The coating 10 is passed through a pair of hard surfaced pinch rollers 40 and the Copper Nickel alloy granules 26 are pushed into the adhesive layer 24. The rollers 40 are adjustably mounted to enable the amount of pressure applied onto the coating 10 to be adjusted, for example for different thickness of the metallic material layer 26. The rollers 40 are faced with a non-stick coating, which in this example is PTFE, to prevent the Copper Nickel alloy granules 26 and the adhesive from sticking to the surfaces of the rollers 40.

The coating 10 is then heated to a high temperature in an oven 42 In order to thermally cure the adhesive layer 24, thereby fixing the Copper Nickel alloy granules 26 in position on the adhesive layer and fixing the adhesive layer 24 on the carrier membrane 22.

It will be appreciated that where a different type of adhesive is used for the adhesive layer 24, a different type of curing process may be required. For example, where the adhesive is optically curable, exposure of the adhesive to an optical source causing polymerisation of the adhesive, the oven 42 would be replaced by an optical source operable to generate an optical signal having a narrow spectral bandwidth lying within the ultra violet or infra red regions of the optical spectrum. Alternatively, where the adhesive is chemically curable, the oven 42 would be replaced by a curing chamber in which the coating 10 is exposed to one or more catalytic chemicals, the adhesive being catalytically cured by exposure to the catalysts. The catalytic chemicals may be provided within a liquid or a gas, in which the coating is immersed within the curing chamber.

In use, the coating 10 is applied to an external surface of a marine article, such as the hull of a ship, by means of a second layer of adhesive which is applied to one or both of the hull of the ship and the other side of the carrier membrane 22. The layer of metallic material 26 is therefore outermost following application of the coating 10 to a marine article. This process is carried out with the marine article out of water, for example in a dry-dock.

Figure 5:
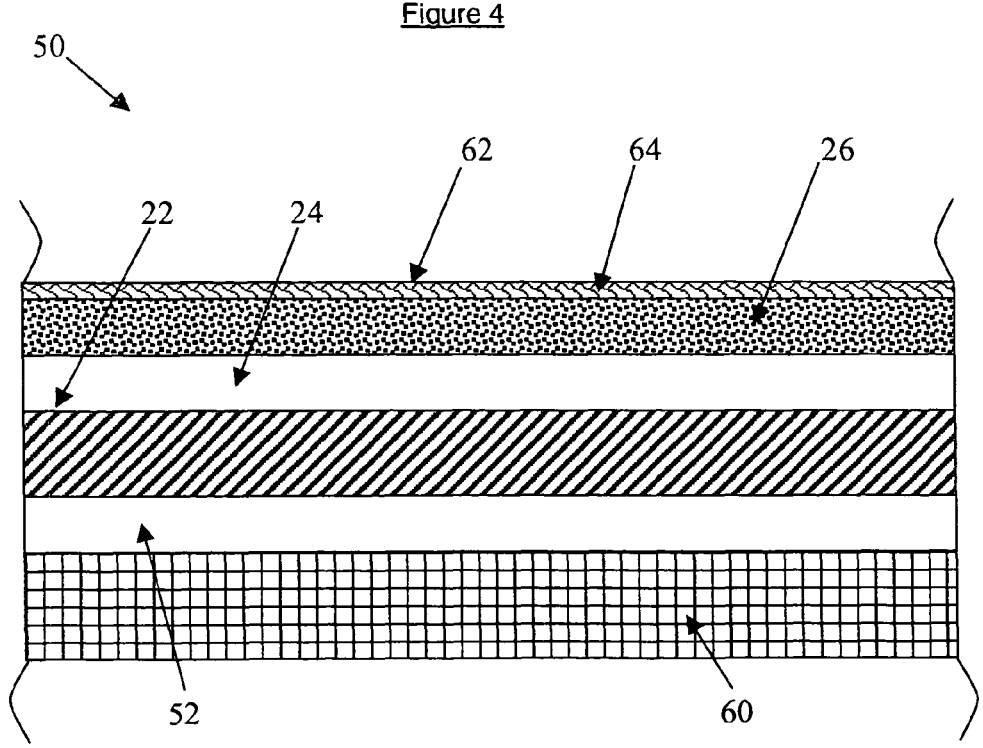
FIG. 5 is a diagrammatic cross-sectional view of a section of a marine anti-bio-fouling coating according to a second embodiment of the invention.

A further embodiment of the invention provides a marine anti-bio-fouling coating 50 as shown in FIG. 5. The coating 50 according to this embodiment is substantially the same as the coating 10 of the first embodiment, with the following modifications. The same reference numerals are retained for corresponding features.

The coating 50 according to this embodiment additionally comprises a second layer of adhesive 52 and a removable backing layer 54. The second layer of adhesive 52 is provided across the other side of the carrier membrane 22. Similarly to the first adhesive layer 24, the second layer of adhesive 52 comprises a layer of an adhesive which is resistant to long term submersion in water. In contrast to the coating 10 of the first embodiment, the coating 50 is self-adhesive.

The removable backing layer 54 is provided on top of the second layer of adhesive 42 and serves to protect the second adhesive layer 52 prior to the coating 50 being applied to the surface of a marine article to be protected. In use, the backing layer 54 is removed and the coating 50 is fixed to the marine article with the marine article out of the water.

The above described manufacturing process includes the following further steps when used to manufacture the coating 50 of the fourth embodiment. A second layer of adhesive 52 is applied across the other side of the carrier membrane 22 and a removable backing layer is provided on top of the second layer of adhesive 52. The second layer of adhesive 52 may be applied using the adhesive applicator 32. The second layer of adhesive 52 and the backing layer 54 may be applied before the steps of above described method of manufacture, or after.

Figure 6:
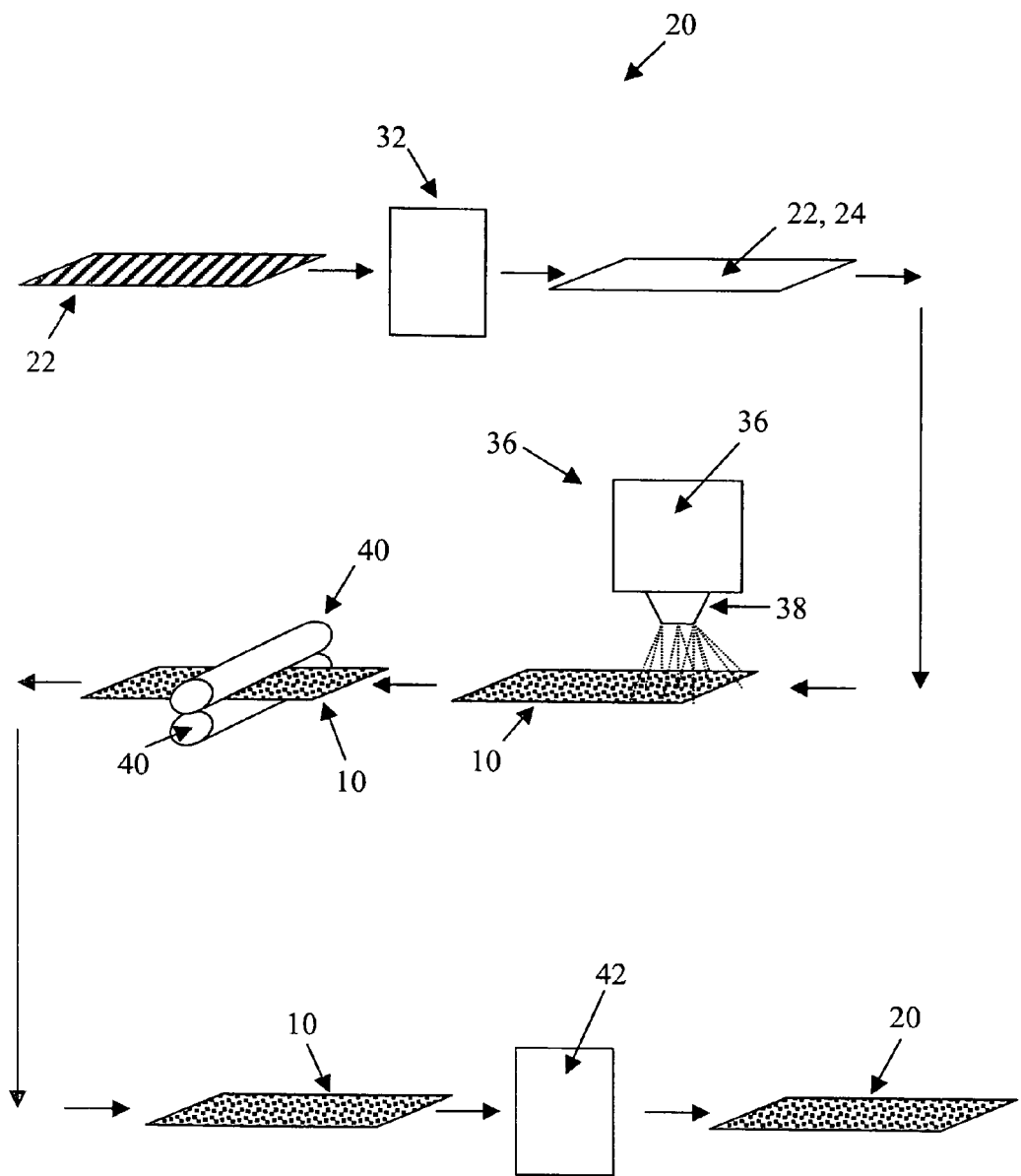
FIG. 6 is a diagrammatic cross-sectional view of the section of marine anti-bio-fouling coating of FIG. 4 following submersion in water.

FIG. 6 shows the coating 50 when in use, applied to the external surface 60 of a marine article, such as the hull of a boat.

The coating 50 is applied to a marine article so that the layer of granulated Copper Nickel alloy 26 is exposed to water 62 when the marine article is in the water. As a result of the chemical reaction which occurs between the water 62 and the Copper Nickel alloy 26, a film of a complex metal oxide 64 is formed on the exterior surface of the layer of granulated Copper Nickel alloy 26. The oxide film 64 forms an inhospitable environment to aquatic organisms and aquatic borers, thereby preventing bio-fouling occurring on the coated marine article.

The above described embodiments provide various advantages, as follows. The oxide film is thin but durable, and due to its robust nature and relative inertness to corrosion, the layer of granulated Copper Nickel alloy is long lasting when compared to currently available anti-fouling paint. A single application of the described anti-bio-fouling coatings will last for many years, removing the need for an annual treatment, and little or no maintenance of the coating is required over its lifetime. The described coatings are generally environmentally friendly, and result in little or no pollution to the marine environment.

Various modifications may be made without departing from the present invention. For example, the carrier membrane may be formed from a different material and different adhesives may be used to those described. The metallic material may comprise a different metal alloy, or combination of metals, to that described and the Copper Nickel alloy may have a different composition to that described.

Referring to the apparatus for manufacturing a marine anti-bio-fouling coating, pressure may be applied using a different arrangement to the described rollers and the granulated metallic material may be distributed across the adhesive layer using a different mechanism to that described.

The coatings may be pre-treated by immersion in water or a dilute acidic solution, so that a metal oxide film is present across the layer of metallic material prior to the coating being applied to a marine article, this pre-oxidation treatment can be carried out as part of the manufacturing process or to the finished product prior to it's use. This may be of particular use for areas of a marine article which are periodically or repeatedly submersed in water, but which are not constantly immersed in water.

The invention claimed is:

1. A process to apply a marine anti-bio-fouling layer comprising:
   cleaning a surface;
   applying a primer adhesive onto the surface;
   applying a binder adhesive over the primer adhesive; and
   applying a plurality metallic granules comprising copper or a copper alloy over the binder adhesive that is applied over the primer adhesive, the binder adhesive and the primer adhesive thereby coupling the plurality of metallic granules to the surface, wherein the plurality of metallic granules comprises one or more metals which oxidize when in contact with water, such that, when the surface having the marine anti-fouling layer applied thereto is immersed in water, a layer of metal oxide is formed on an exterior surface of the plurality of metallic granules in contact with the water; wherein the copper alloy comprises a copper nickel alloy comprising eighty-eight percent copper and ten percent nickel, the remaining two percent comprising Iron and Manganese;
   wherein the granules are substantially spherical and have a size of up to 250 microns:
   wherein the primer adhesive is a self-curing and self-leveling adhesive; and
   wherein the binder adhesive is a self-curing adhesive, is an adhesive modified epoxy resin, and is provided as a layer having a thickness of not more than two-thirds the diameter of the plurality of metallic granules.

2. A process as claimed in claim 1, wherein the binder adhesive comprises a solvent free cyclo aliphatic/aliphatic amine cured bisphenol A type epoxy resin system containing free flowing dry amorphous materials.

3. A process as claimed in claim 1, wherein the metallic material comprises a copper nickel alloy of eighty-eight percent copper and ten percent nickel, the remaining two percent comprising Iron and Manganese.

* * * * *